(12) United States Patent
Lawrence

(10) Patent No.: US 8,521,591 B1
(45) Date of Patent: Aug. 27, 2013

(54) METHODS AND SYSTEMS FOR CORRELATING CONNECTIONS BETWEEN USERS AND LINKS BETWEEN ARTICLES

(75) Inventor: Stephen R. Lawrence, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/270,930

(22) Filed: Oct. 11, 2011

Related U.S. Application Data

(63) Continuation of application No. 11/026,681, filed on Dec. 31, 2004, now Pat. No. 8,060,405.

(51) Int. Cl.
*G06Q 30/00* (2006.01)
*G05B 19/418* (2006.01)

(52) U.S. Cl.
USPC ............................ 705/14.54; 705/7.11

(58) Field of Classification Search
None
See application file for complete search history.

(56) References Cited

U.S. PATENT DOCUMENTS

| | | | |
|---|---|---|---|
| 5,537,586 A | 7/1996 | Amram et al. |
| 5,796,393 A | 8/1998 | MacNaughton et al. |
| 6,073,138 A | 6/2000 | de l'Etraz et al. |
| 6,130,938 A | 10/2000 | Erb |
| 6,192,119 B1 | 2/2001 | Wilson |
| 6,327,590 B1 | 12/2001 | Chidlovskii |
| 6,366,962 B1 | 4/2002 | Teibel |
| 6,389,372 B1 | 5/2002 | Glance et al. |
| 6,421,678 B2 | 7/2002 | Smiga et al. |
| 6,442,567 B1 | 8/2002 | Retallick et al. |
| 6,526,440 B1 | 2/2003 | Bharat |
| 6,529,903 B2 | 3/2003 | Smith et al. |
| 6,594,673 B1 | 7/2003 | Smith et al. |
| 6,615,209 B1 | 9/2003 | Gomes et al. |
| 6,658,423 B1 | 12/2003 | Pugh et al. |
| 6,697,478 B1 | 2/2004 | Meldrum et al. |
| 6,725,259 B1 | 4/2004 | Bharat |
| 6,754,322 B1 | 6/2004 | Bushnell |
| 6,754,873 B1 | 6/2004 | Law et al. |

(Continued)

FOREIGN PATENT DOCUMENTS

| | | |
|---|---|---|
| CN | 1949220 A | 4/2007 |
| EP | 1288795 | 3/2003 |

(Continued)

OTHER PUBLICATIONS

"An Electronic Nightmare". Internet/Web/Online Service Information. Lent, Anne Fischer. Ent , v 11 , n 2 , p. 42. Jul. 16, 1997.*

(Continued)

*Primary Examiner* — Victoria Vanderhorst
(74) *Attorney, Agent, or Firm* — Patent Law Works LLP

(57) ABSTRACT

Methods and systems for correlating connections between users and links between articles to identify search and/or ad spamming are disclosed. Social networks can be used to identify connections between users for correlation with links between articles, which can be identified through searches of article contents and/or back tracing accesses to articles. One disclosed method comprises identifying first associations between a plurality of users in a network of associated users; identifying second associations between one or more users and one or more articles; identifying third associations between at least some of the articles or between some of the users and access to some of the articles; and determining at least one of the third associations is correlated with one or more of the first associations.

20 Claims, 5 Drawing Sheets

(56) References Cited

U.S. PATENT DOCUMENTS

| | | | |
|---|---|---|---|
| 6,799,176 | B1 | 9/2004 | Page |
| 6,867,733 | B2 | 3/2005 | Sandhu et al. |
| 6,895,406 | B2 | 5/2005 | Fables et al. |
| 6,895,551 | B1* | 5/2005 | Huang et al. ............. 715/205 |
| 7,069,308 | B2 | 6/2006 | Abrams |
| 7,080,117 | B2 | 7/2006 | De Pinto et al. |
| 7,092,821 | B2 | 8/2006 | Mizrahi et al. |
| 7,106,848 | B1 | 9/2006 | Barlow et al. |
| 7,117,254 | B2 | 10/2006 | Lunt et al. |
| 7,118,153 | B2 | 10/2006 | Kitayama et al. |
| 7,130,777 | B2 | 10/2006 | Garg |
| 7,130,844 | B2 | 10/2006 | Elder et al. |
| 7,155,608 | B1 | 12/2006 | Malik et al. |
| 7,269,590 | B2 | 9/2007 | Hull |
| 7,275,068 | B2 | 9/2007 | Huberman et al. |
| 7,343,335 | B1 | 3/2008 | Olliphant |
| 7,360,080 | B2 | 4/2008 | Camnisch et al. |
| 7,366,990 | B2 | 4/2008 | Pitroda |
| 7,418,268 | B1 | 8/2008 | Cabano et al. |
| 7,433,832 | B1 | 10/2008 | Bezos et al. |
| 7,454,464 | B2 | 11/2008 | Puthenkulam et al. |
| 7,478,078 | B2 | 1/2009 | Lunt et al. |
| 7,555,110 | B2 | 6/2009 | Dolan et al. |
| 7,610,287 | B1 | 10/2009 | Dean et al. |
| 7,742,468 | B2 | 6/2010 | Vagelos |
| 7,890,581 | B2* | 2/2011 | Rao et al. ................. 709/204 |
| 2001/0039500 | A1 | 11/2001 | Johnson |
| 2001/0054020 | A1 | 12/2001 | Barth et al. |
| 2002/0002445 | A1* | 1/2002 | Doliov ...................... 703/2 |
| 2002/0042791 | A1 | 4/2002 | Smith et al. |
| 2002/0059130 | A1 | 5/2002 | Cheng et al. |
| 2002/0059201 | A1 | 5/2002 | Work |
| 2002/0103682 | A1 | 8/2002 | Stemmer |
| 2002/0116458 | A1 | 8/2002 | Bricklin |
| 2002/0116466 | A1 | 8/2002 | Trevithick et al. |
| 2002/0137490 | A1 | 9/2002 | Gallant |
| 2002/0143874 | A1 | 10/2002 | Marquette et al. |
| 2002/0169835 | A1 | 11/2002 | Paul |
| 2003/0020977 | A1 | 1/2003 | Smith et al. |
| 2003/0083898 | A1 | 5/2003 | Wick |
| 2003/0154213 | A1 | 8/2003 | Ahn |
| 2003/0163530 | A1 | 8/2003 | Ribak |
| 2003/0233650 | A1 | 12/2003 | Zaner et al. |
| 2004/0041836 | A1 | 3/2004 | Zaner et al. |
| 2004/0042599 | A1 | 3/2004 | Zaner et al. |
| 2004/0088325 | A1 | 5/2004 | Elder et al. |
| 2004/0122681 | A1 | 6/2004 | Ruvolo et al. |
| 2004/0122803 | A1 | 6/2004 | Dom et al. |
| 2004/0148275 | A1 | 7/2004 | Achlioptas |
| 2004/0162830 | A1 | 8/2004 | Shirwadkar et al. |
| 2004/0167794 | A1 | 8/2004 | Shostack |
| 2004/0221309 | A1 | 11/2004 | Zaner |
| 2004/0225681 | A1 | 11/2004 | Chaney et al. |
| 2004/0249811 | A1 | 12/2004 | Shostack et al. |
| 2004/0258220 | A1 | 12/2004 | Levine et al. |
| 2004/0260781 | A1 | 12/2004 | Shostack et al. |
| 2005/0015432 | A1 | 1/2005 | Cohen |
| 2005/0021750 | A1 | 1/2005 | Abrams |
| 2005/0050158 | A1 | 3/2005 | Solari |
| 2005/0071741 | A1 | 3/2005 | Acharya et al. |
| 2005/0131894 | A1 | 6/2005 | Vuong |
| 2005/0152521 | A1 | 7/2005 | Liljestrand |
| 2005/0159998 | A1* | 7/2005 | Buyukkokten et al. ......... 705/11 |
| 2005/0165785 | A1 | 7/2005 | Malkin et al. |
| 2005/0171832 | A1 | 8/2005 | Hull et al. |
| 2005/0171954 | A1 | 8/2005 | Hull et al. |
| 2005/0193054 | A1 | 9/2005 | Wilson et al. |
| 2005/0197846 | A1 | 9/2005 | Pezaris et al. |
| 2005/0198031 | A1 | 9/2005 | Pezaris et al. |
| 2005/0209999 | A1 | 9/2005 | Jou |
| 2005/0210409 | A1 | 9/2005 | Jou |
| 2005/0216300 | A1 | 9/2005 | Appelman et al. |
| 2005/0246420 | A1 | 11/2005 | Little |
| 2005/0256866 | A1 | 11/2005 | Lu et al. |
| 2005/0267766 | A1 | 12/2005 | Galbreath et al. |
| 2005/0267940 | A1 | 12/2005 | Galbreath et al. |
| 2005/0283497 | A1 | 12/2005 | Nurminen et al. |
| 2006/0026288 | A1 | 2/2006 | Acharya et al. |
| 2006/0036746 | A1 | 2/2006 | Davis |
| 2006/0077957 | A1 | 4/2006 | Reddy et al. |
| 2006/0136419 | A1 | 6/2006 | Brydon et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0004941 | A1 | 1/2008 | Calabria |
| 2008/0056475 | A1 | 3/2008 | Brannick et al. |
| 2008/0133716 | A1 | 6/2008 | Rao et al. |
| 2008/0192656 | A1 | 8/2008 | Vagelos |
| 2009/0013386 | A1 | 1/2009 | Puthenkulam et al. |
| 2011/0098156 | A1 | 4/2011 | Ng et al. |

FOREIGN PATENT DOCUMENTS

| | | |
|---|---|---|
| JP | 11265369 A | 9/1999 |
| WO | 00/68860 A3 | 11/2000 |
| WO | 01/24551 A1 | 4/2001 |
| WO | 01/84266 | 11/2001 |
| WO | 02/079984 | 10/2002 |

OTHER PUBLICATIONS

Lance, G.N. et al., "Computer programs for hierarchical polythetic classification (similarity analyses:)," The Computer Journal, C.S.I.R.O. Computing Research Section, 1967, vol. 9, pp. 60-64.

Lance, G.N. et al., "A Generalized Sorting Strategy for Computer Classifications," Nature, Oct. 8, 1966, vol. 212, p. 218.

Lance, G.N., et al., "A General Theory of Classificatory Sorting Strategies 1. Hierarchical Systems," The Computer Journal, C.S.I.R.O. Computing Research Section, 1967, vol. 9, No. 4, pp. 373-380.

Lance, G.N., et al., "Mixed-data classificatory programs. I. Agglomerative Systems," Austral. Comput. J., 1967, vol. 1, pp. 15-20.

Milligan, G., "Ultrametric Hierarchical Clustering Algorithms," Psychometrika, Sep. 1979, vol. 44, No. 3, pp. 343-346.

Tan, P.N., et al., "Cluster Analysis: Basic Concepts and Algorithms," Introduction to Data Mining, Chapter 8 (Section 8.3.3—The Lance-Williams Formula for Cluster Proximity, p. 524), 2006, pp. 487-568.

Ramana, Rao, "The Secret of Unstructured Data", E-Doc. vol. 16, No. 5, Sep.-Oct. 2002, pp. 14-15.

Adamic et al., "A Social Network Caught in the Web," Internet Journal, First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, 8 pgs., Jan. 2006.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Murchu et al., "Online Social and Business Networking Communities," Digital Enterprise Research Institute DERI Technical Report, National University of Ireland, Aug. 11, 2004, 22 pgs.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, pp. 1-83, Feb. 2004.
Steen et al., "Development of we-centric, context-aware, adaptive mobile services requires empathy and dialogue," Freeband FRUX, Oct. 17, 2005, Internet Journal, Netherlands, pp. 1-4.
SUPERFEEDR Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.
DOCTOROW, "Running Notes From Revenge of the User: Lessons from Creator/User Battles," web page at http://craphound.com/danahetcon04.txt, as available via the Internet and printed Jul. 28, 2004.
Jensen, C., et al., "Finding Others Online: Reputation Systems for Social Online Spaces," Group Spaces, CHI 2002, Apr. 20-25, 2002, vol. 4, Iss. 1, pp. 447-454.
Sullivan, Danny, "Is It Really Personalized Search?" http://searchengine watch.com, printed May 13, 2004.
Multiply, "About Multiply," web page at http://multiply.com/info/about, as available via the Internet and printed May 3, 2004.
Multiply, "Help," web page at http://multiply.comlinfo/help, as available via the Internet and printed May 3, 2004.
Multiply, "Multiply Privacy Policy," web page at http://multiply.com/info/privacy, as available via the Internet and printed on May 3, 2004.
Multiply, "Multiply Terms of Service," web page at http://multiply.com/info/tos, as available via the Internet and printed on printed May 3, 2004.
"PlanetAll," From Internet Archive Wayback Machine on Nov. 1997, [online] [Retrieved on Mar. 17, 2004] Retrieved from the internet <URL: Internet Archive Wayback Machine: www.archive.org/www/planetall.com>, 19 pgs.
Google, Inc., "Google Answers," Google, 2004, [online] [retrieved on Jul. 29, 2004] retrieved from the internet <URL: http://answers.google.com/answers/>, 1 pg.
Google, Inc., "Google Answers: Frequently Asked Questions," Google, 2003, [online] [retrieved on Jul. 29, 2004] retrieved from the Internet <URL:http://answers.google.com/answers/faq.html>, 9 pgs.
Yahoo! Inc., "Yahoo! Groups," Yahoo! Inc., 2004, [online] [retrieved on Jul. 29, 2004] retrieved from the internet <URL: http://groups.yahoo.com>, 2 pgs.
Yahoo! Inc., "Yahoo! Help—Groups," Yahoo! Inc., 2004, [online] [retrieved on Jul. 29, 2004] retrieved from the internet <URL:http://help.yahoo.com/help/us/groups/groups-01.html>, 12 pgs.
Yahoo! Inc., "Yahoo! Help—Groups Database," Yahoo! Inc., 2004, [online] [retrieved on Jul. 29, 2004] retrieved from the internet <URL:http://help.yahoo.com/help/us/groups/database>, 9 pgs.
Yahoo! Groups, "Customize LostDrive-In," web page at http://groups.yahoo.com/group/lostdrivein/conwiz, as available via the Internet and printed Jun. 2, 2004.
NomadNet, "Nomad Net News," web page at http://www.netnomad.com/, as available via the Internet and printed Dec. 1, 2004.
PC World, "PCWorld—ICQ Builds a Social Network," web page at http://www.gcworld.com/news/article/O,aid,115084,OO.asg, as available via the Internet and printed Dec. 1, 2004.

* cited by examiner

# METHODS AND SYSTEMS FOR CORRELATING CONNECTIONS BETWEEN USERS AND LINKS BETWEEN ARTICLES

CROSS-REFERENCE TO RELATED APPLICATION

The application is a continuation of U.S. application Ser. No. 11/026,681, filed Dec. 31, 2004, which is hereby incorporated by reference in its entirety.

BACKGROUND OF THE INVENTION

1. Field of the Invention

The present invention relates generally to methods and systems for identifying connections between users and links between articles. For example, embodiments of the present invention relate generally to methods and systems for using social networks to identify connections between users, such as members in the social networks, and correlating such connections with links between articles.

2. Background

Online advertising and search engines are ubiquitous on the Internet and World Wide Web. Online advertising in such forms as banner ads and pop-up ads include links that implore viewers to click on the ads and be directed to a linked website for further information on the advertised products or services. Advertisers entice websites to host ads by, for example, paying a flat periodic fee or a set fee per each click through (i.e., a click on the ad to be directed to an advertiser's site). Such financial structure for online advertising is susceptible to ad spamming. For example, webmasters of ad-hosting websites can attempt to increase their financial gains from advertisers by collaborating with one another to excessively click on ads hosted on their websites to increase the number of click-throughs or give the appearance that such ads enjoy high traffic.

A search engine, such as the Google™ search engine, returns a result set in response to an input query submitted by a user. Such search engine may use one or more various methods for performing information retrieval. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures. For example, the search engine may rank the results based on a popularity score. The search engine generally places the most popular results at the beginning of the result set.

Search methods that rely on link structures also can be susceptible to search spamming. For example, a plurality of webmasters or web administrators can collaborate and link their websites with one another to increase the links to each website, or a single particular website, in order to increase the website's ranking and/or chance of appearance in a search result set returned by the search methods.

Social networking websites such as those hosted on Orkut™, Friendster™, Tribe™, or other websites, allow users to form social networks and become network members. Such networks on the social networking websites allow members of each social network to communicate with each other and list announcements associated with the social network. Generally, these social networks do not communicate with search engines and online advertisers, particularly those that rely on web link structures for searching queries, in order to correlate connections between users and links between websites or web documents and identify ad and search spammings.

SUMMARY OF THE INVENTION

Embodiments of the present invention provide methods and systems for correlating connections between users and links between articles. In one embodiment of the present invention, there is provided a method comprising: identifying first associations between a plurality of users in a network of associated users; identifying second associations between one or more users and one or more articles; identifying third associations between at least some of the articles or between some of the users and access to some of the articles; and determining at least one of the third associations is correlated with one or more of the first associations.

The aforementioned embodiment is mentioned not to limit or define the invention, but to provide an example of embodiments of the invention to aid understanding thereof. Such an exemplary embodiment is discussed in the Detailed Description, and further description of the invention is provided there. Advantages offered by the various embodiments of the present invention may be further understood by examining this specification.

BRIEF DESCRIPTION OF THE DRAWINGS

The embodiments of the present invention are illustrated by way of example in, and not limited to, the following figures.

DETAILED DESCRIPTION

Overview

As referred herein, search spamming includes any unauthorized or "unnatural" manipulation or exploitation of a search engine's searching methodology and/or search result sets in order to affect the listing and/or ranking of article identifiers in the search result sets. Likewise, as referred herein, ad spamming includes any unnatural manipulation of accesses to ads or the monitoring of ad access (e.g., an unnatural manipulation may include clicks on ads that are driven by some motive other than genuine consumer interest in the content of the ad).

Also, as referred herein, a search result set comprises one or more identifiers of articles that are relevant to a search query. Articles include, for example: word processor, spreadsheet, presentation, e-mail, instant messenger, database, and other client application program content files or groups of files; web pages of various formats (e.g., HTML, XML, XHTML); portable document format (PDF) files; audio files;

video files; or any other documents or groups of documents or information of any type whatsoever. Articles can be used as ads to advertise products or services. An article identifier may be, for example, a uniform resource locator (URL), a uniform resource identifier (URI), an Internet Protocol (IP) address, a file name, a link, an icon, a path for a local file, or anything else that identifies an article.

Further, as referred herein, each article has an article administrator that is responsible for the design, implementation, and/or maintenance of the article. Each article administrator can be identified by one or more administrator identifiers, which may be, for example, a name of an article administrator, an e-mail address of an article administrator, or anything else that can identify an article administrator.

Embodiments of the present invention provide methods and systems for identifying connections between users and links between articles and correlating the connections and links to determine the independence of such links. In one embodiment, the method begins with a determination of connections between users based on personalization information obtained from a social network to which the users belong. The connections information is then stored in a database. Next, desired articles are located from a network to test the independence of any links to and/or from such articles. The administrators of such articles, links to and from the articles, and the administrators of such links are also identified and stored in an article index. Next, the connections information is retrieved from the database for correlation with the information stored in the article index to determine whether the links to and from the articles are independent, e.g., such links are not based on existing relationships/associations found between the users in the social network.

System Architecture

Figure 1:
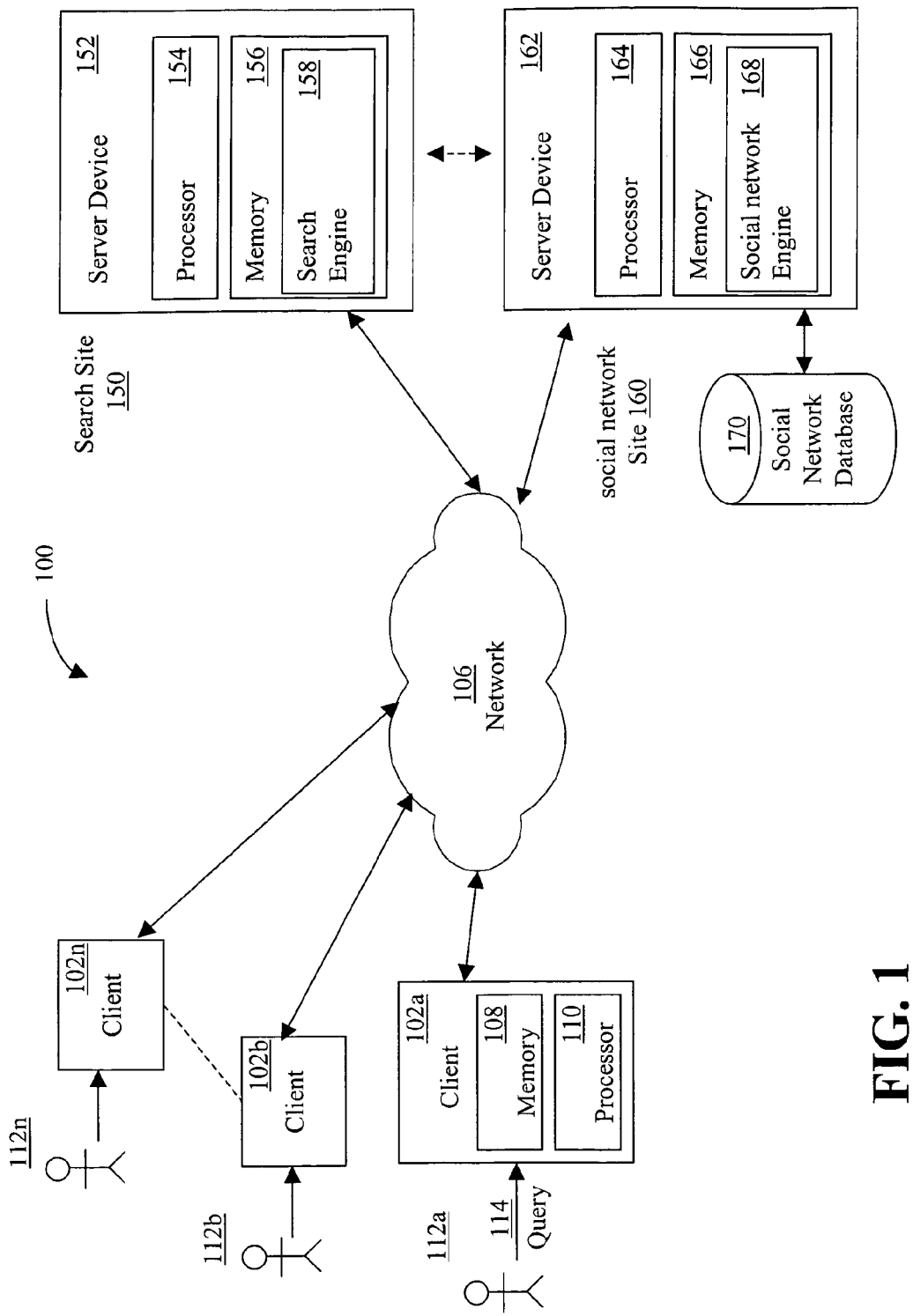
FIG. 1 is a block diagram illustrating an exemplary environment in which embodiments of the present invention may operate.

Various systems in accordance with the present invention may be constructed. FIG. 1 is a block diagram illustrating an exemplary system in which embodiments of the present invention can operate. The present invention may operate, and be embodied, in other systems as well.

Referring now to the drawings in which like numerals indicate like elements throughout the several figures, FIG. 1 is a block diagram illustrating an exemplary system in accordance with an exemplary embodiment of the present invention. The system 100 shown in FIG. 1 includes multiple client devices 102a-n with users 112a-112n in communication with a search site 150 and a social network site 160 over a network 106. The search site 150 and the social network site 160 are also in communication with each other directly (as shown by the dashed line) or through the network 106. The network 106 can be a wired or wireless network. Further, it can be a public network, e.g., the Internet, or a private data network, e.g., a local area network (LAN) or a wide area network (WAN). The search site is not required in some embodiments. Moreover, methods according to the present invention may operate within a single computer.

Each of the client devices 102a-n includes a memory 108, which can be a computer-readable medium (CRM), such as a random access memory (RAM), coupled to a processor 110. The processor 110 executes computer-executable program instructions stored in the client device, such as memory 108, as program code. Such processor may include a microprocessor, an ASIC, and state machines. Such processors include, or may be in communication with, media, for example computer-readable media, which stores instructions that, when executed by the processor, cause the processor to perform the methods described herein. Moreover, the processor 110 can be any of a number of computer processors, such as processors from Intel Corporation of Santa Clara, Calif. and Motorola Corporation of Schaumburg, Ill. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may include code from any suitable computer-programming language, including, for example, C, C++, C#, Visual Basic, Java, Python, Perl, and JavaScript.

Client devices 102a-n can also include a number of external or internal devices such as a mouse, a CD-ROM drive, a DVD drive, a keyboard, a display, or other input or output devices. Examples of client devices 102a-n are personal computers, digital assistants, personal digital assistants (PDAs), cellular phones, mobile phones, smart phones, pagers, digital tablets, laptop computers, Internet appliances, and other processor-based devices. In general, the client devices 102a-n can be any type of processor-based platform that operates on any operating system capable of supporting one or more client application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other sites, systems and devices coupled to the network 106. As shown in FIG. 1, a search site 150 and a social network site 160 are also coupled to the network 106.

The search site 150 shown includes a server device 152 executing a search application program. Similar to the client devices 102a-n, the server device 152 shown includes a processor 154 coupled to a CRM 156. Server device 152, depicted as a single computer system, may be implemented as a network of computer processors. Examples of the server device 162 are servers, mainframe computers, networked computers, a processor-based device, and similar types of systems and devices. The server processor 154 can be any of a number of computer processors, such as processors from Intel Corporation of Santa Clara, Calif. and Motorola Corporation of Schaumburg, Ill.

Memory 156 contains a search application program, also known as a search engine 158. The search engine 158 locates relevant information in response to a search query from one of the client devices 102a-n, e.g., the client device 102a. The search engine 158 then provides a search result set to the client device 102a via the network 106. The search result set comprises one or more identifiers of articles that are relevant to the search query. Articles include, for example: word processor, spreadsheet, presentation, e-mail, instant messenger, database, and other client application program content files or groups of files; web pages or websites of various formats (e.g., HTML, XML, XHTML); portable document format (PDF) files; audio files; video files; or any other documents or groups of documents or information of any type whatsoever. Articles can be used as ads to advertise products or services.

An article identifier may be, for example, a uniform resource locator (URL), a uniform resource identifier (URI), an Internet Protocol (IP) address, a file name, a link, an icon, a path for a local file, or anything else that identifies an article.

The social network site 160 shown includes a social network database 170 and a server device 162 executing a social network engine application program. Similar to the client devices 102a-n, the server device 162 shown includes a processor 164 coupled to a CRM 166. The server device 162 is in communication with a social network database 170. Server device 162, depicted as a single computer system, may be implemented as a network of computer processors. Examples of the server device 162 are servers, mainframe computers, networked computers, a processor-based device, and similar types of systems and devices. The server processor 164 can be any of a number of suitable computer processors, such as processors from Intel Corporation of Santa Clara, Calif. and Motorola Corporation of Schaumburg, Ill.

Memory 166 in the server device 162 contains a social network engine application program, also known as a social network engine 168. The social network engine 168 allows users, such as user 112a, to interact with and participate in a social network. A social network can refer to a network connecting people or organization by a set of relationships, such as social relationships like friendship, co-working, or information exchange. A social network can include profiles that can be associated with other profiles. Each profile may represent a member and a member can be, for example, a person, an organization, a business, a corporation, a community, a fictitious person, or other entity. Each profile can contain entries, and each entry can include information associated with a profile. Examples of entries for a person profile can include information regarding relationship status, birth date, age, children, ethnicity, religion, political view, sense of humor, sexual orientation, fashion preferences, smoking habits, drinking habits, pets, hometown location, passions, sports, activities, favorite books, music, television, or movie preferences, favorite cuisines, email addresses, location information, IM name, phone number, address, skills, career, or any other information describing, identifying, or otherwise associated with a profile. Entries for a business profile can include market sector, customer base, location, supplier information, net profits, net worth, number of employees, stock performance, or other types of information associated with the business profile.

Additionally, entries within a profile can include associations with other profiles. Associations between profiles within a social network can include, for example, friendships, business relationships, acquaintances, community or group associations, activity partner associations, common interest associations, common characteristic associations, or any other suitable type of relationship connection (e.g., social relationship connection). Members can set up new associations or join existing associations in the social network as desired. For example, a member can set up a "Computer Science community" for those members who are interested or work in the computer science field. Likewise, a member can join an existing "Baseball community" if the member is interested in baseball and/or sport in general. Associations between profiles can also have various levels. For example, friendship levels can include, for example, a "haven't met" level, an "acquaintance" level, a "friend" level, a "good friend" level, a "best friend" level, and other suitable levels.

A degree of separation based on associations between profiles can also be determined. For example, a degree of separation can be determined based on the fewest number of associations between two profiles. Thus, if profile A is a friend of profile B, and profile B is a friend of profile C, there can be a degree of separation of two between profiles A and C. A degree of separation can be type specific or type neutral. Type specific degrees of separation only count relationships of a certain type. Thus, for example, in the case above where A is a friend of B, and B is a friend of C, there is a friendship degree separation of two, even if A is directly associated with C by a business association, which would otherwise produce a degree of separation of 1.

Server device 162 of the social network site 160 also provides access to storage elements, such as a social network storage element, in the example shown in FIG. 1, a social network database 170. The social network database 170 can be used to store profiles of members in a social network, communities within the social network as created by the member-network engine 168, and all identifiable connections between members in the social network. Data storage elements may include any one or combination of methods for storing data, including without limitation, arrays, hash tables, lists, and pairs. Other similar types of data storage devices can be accessed by the server device 162. The social network engine 168 can receive personalization information associated with each member in the social network from the social network database 170 and send personalization information of members to the social network database 170 for storage. As referred herein, a member's personalization information includes any information that is associated with the member, including any information: 1) contained in the member's profile or other members' profiles; and/or 2) otherwise maintained by the social network and is in any way associated with the member. Further, the social network engine 168 can derive all connections between members in the social network from the personalization information of the members and store such connections information in the social network database 170, or another data storage device, as well. The member-network database 170 may be physically attached or otherwise in communication with the member-network engine 168 by way of a network or other connection.

In operation, the social network engine 168 stores connections information of members in the social network database 170. Next, the search engine 158, or related devices, can perform a crawl of the network 106 to identify: desired articles, administrators of the articles, links to and/or from the articles, and administrators of such links. Such information, once identified, can be stored in an article index for storage in memory 156 or any suitable data storage device. The search engine can subsequently retrieve the information in the article index and correlate with the connections information stored in the social network database 170 to fine tune future searches and/or identify ad spamming.

It should be noted that the present invention may include systems having different architecture than that which is shown in FIG. 1. For example, in some systems according to the present invention, server device 162 may include a single physical or logical server. The system 100 shown in FIG. 1 is merely exemplary, and is used to help explain the social networks and methods illustrated in subsequent figures.

Exemplary Social network

Figure 2:
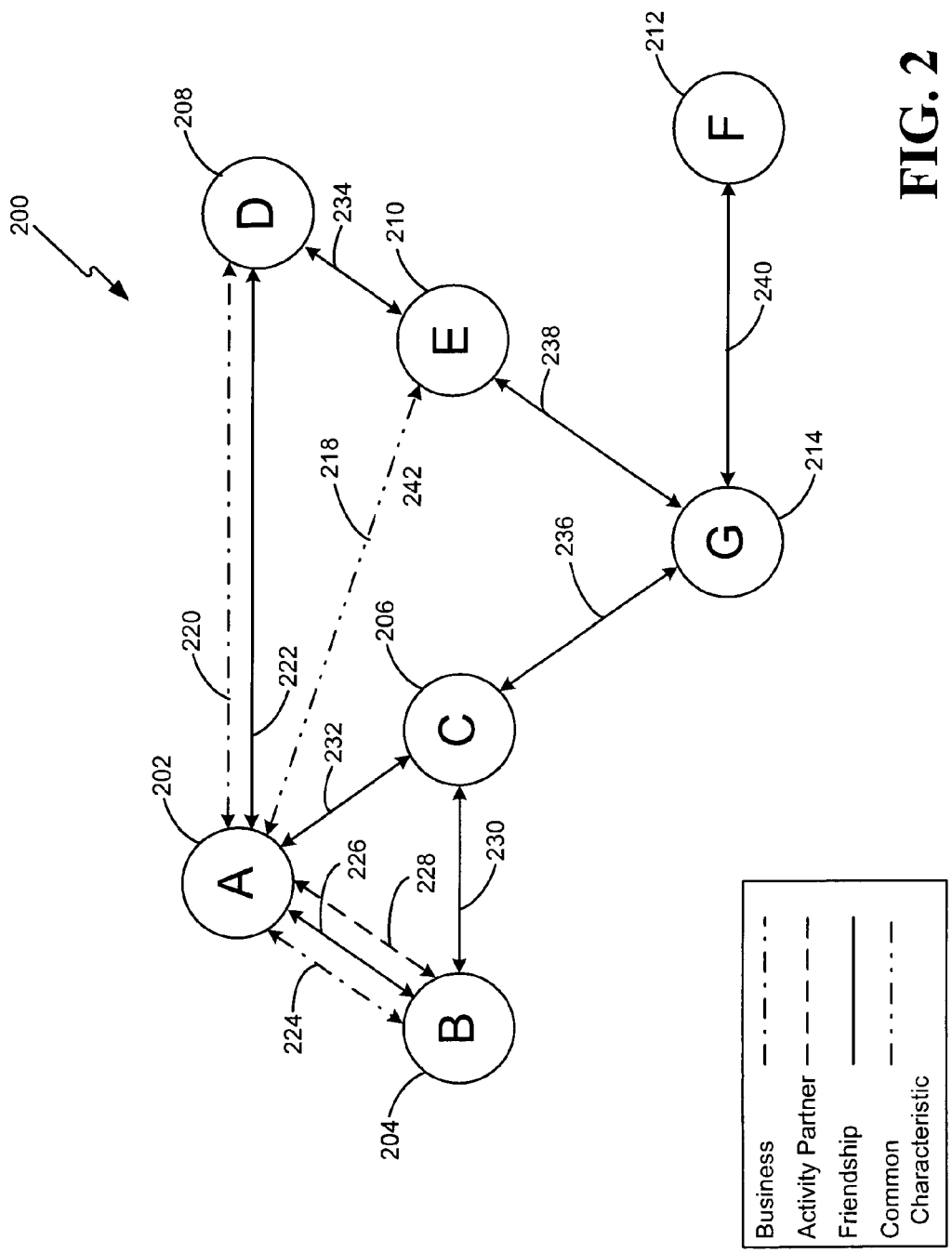
FIG. 2 depicts a diagram of a social network in accordance with an embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the social network 200. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, television or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, information about which web sites the member has accessed or used, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member profile includes an identification of association(s) to which the member belongs. For example, a member profile can indicate that the member belongs to the Computer Science community. In another embodiment, a member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the social network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example, can be that profile A attended the same high school as profile E. A common characteristic association may be selected by profiles A and E to represent that they are associated in some fashion, but to not create a close association such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Process

Various methods or processes in accordance with the present invention may be constructed. For example, in one embodiment, the method begins with the social network engine 168 determining connections information between members in a social network and storing the connections information in the memory 156 or any suitable memory device or database. Next, the search engine 158 locates the desired articles for review, e.g., for search or ad spamming, and identifies the administrator responsible for such articles. The search engine 158 also identifies links to or from the desired articles based on a content search of such articles or a back tracing or tracking of accesses to such articles. The search engine 158 further identifies the administrator of each link so that it can correlate such information with the connections information and determine the independence of each link. In an alternative embodiment, a search site or search engine is not required. Instead, a crawl or any other method can be used to retrieve the contents of desired web sites to locate desired articles for review, links to and from those desired articles, and administrators of such links.

Figure 3:
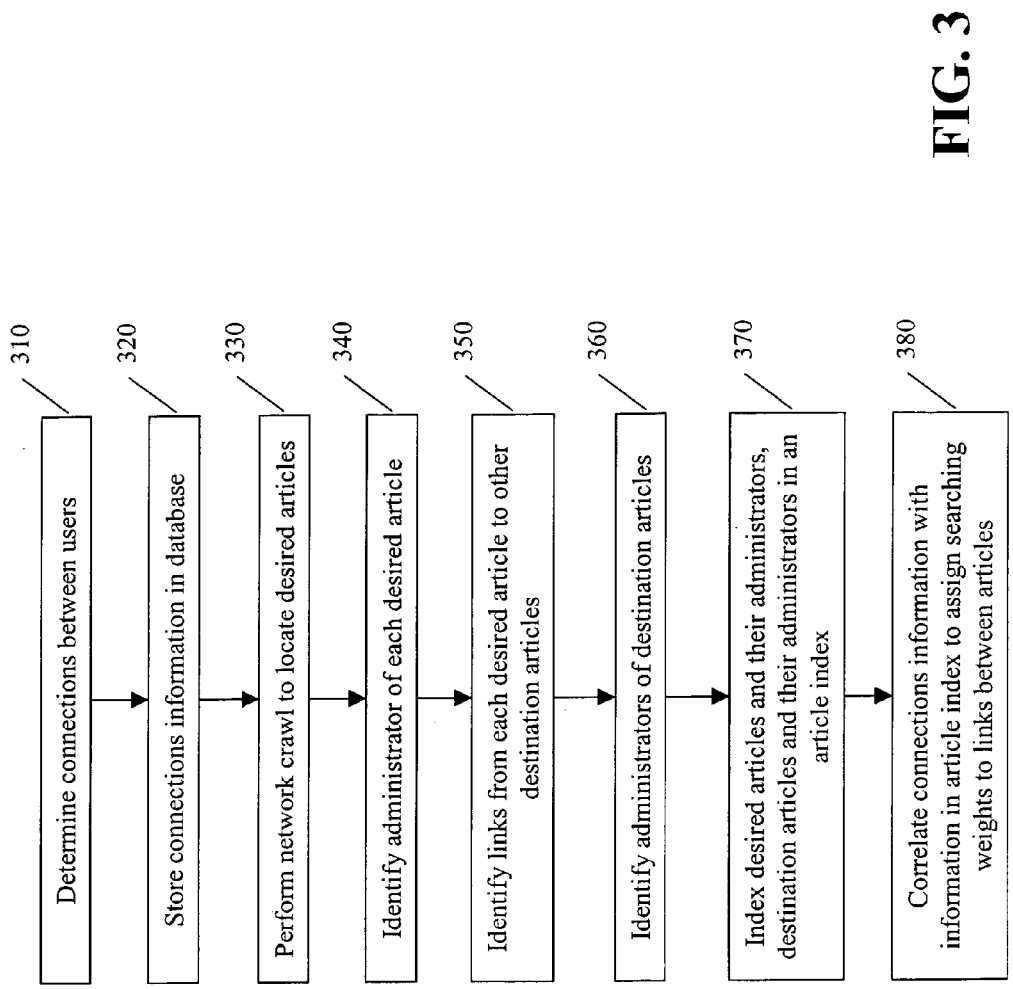
FIG. 3 depicts a process flow for correlating connections between users and links between articles in accordance with an embodiment of the present invention.
Figure 4:
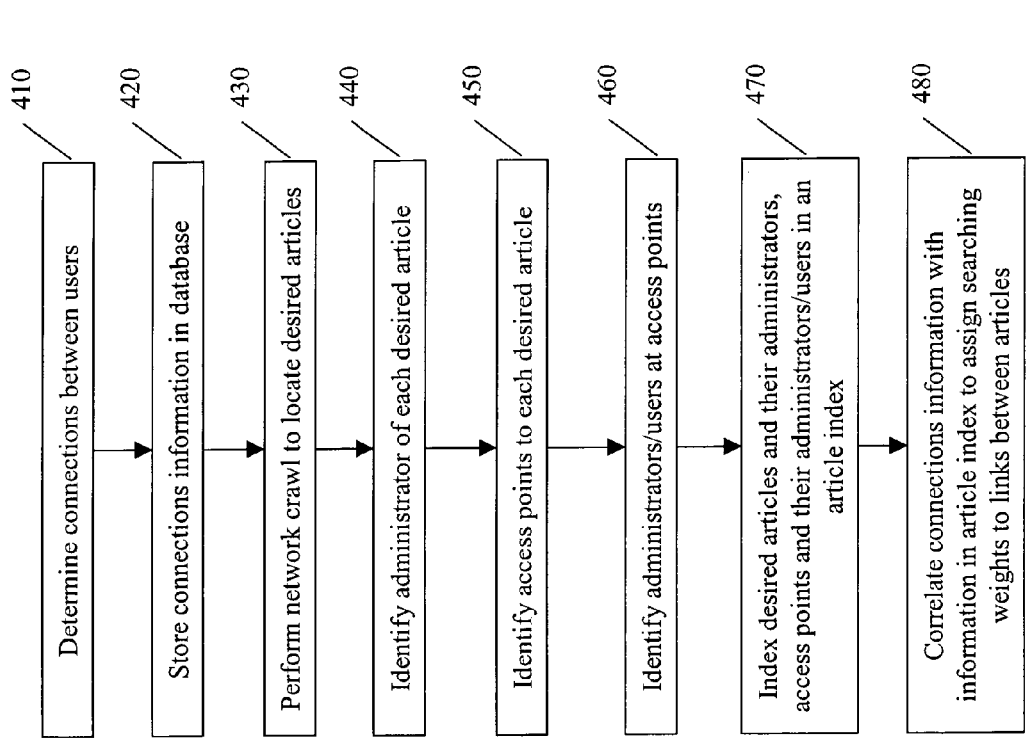
FIG. 4 depicts a process flow for correlating connections between users and links between articles in accordance with another embodiment of the present invention.
Figure 5:
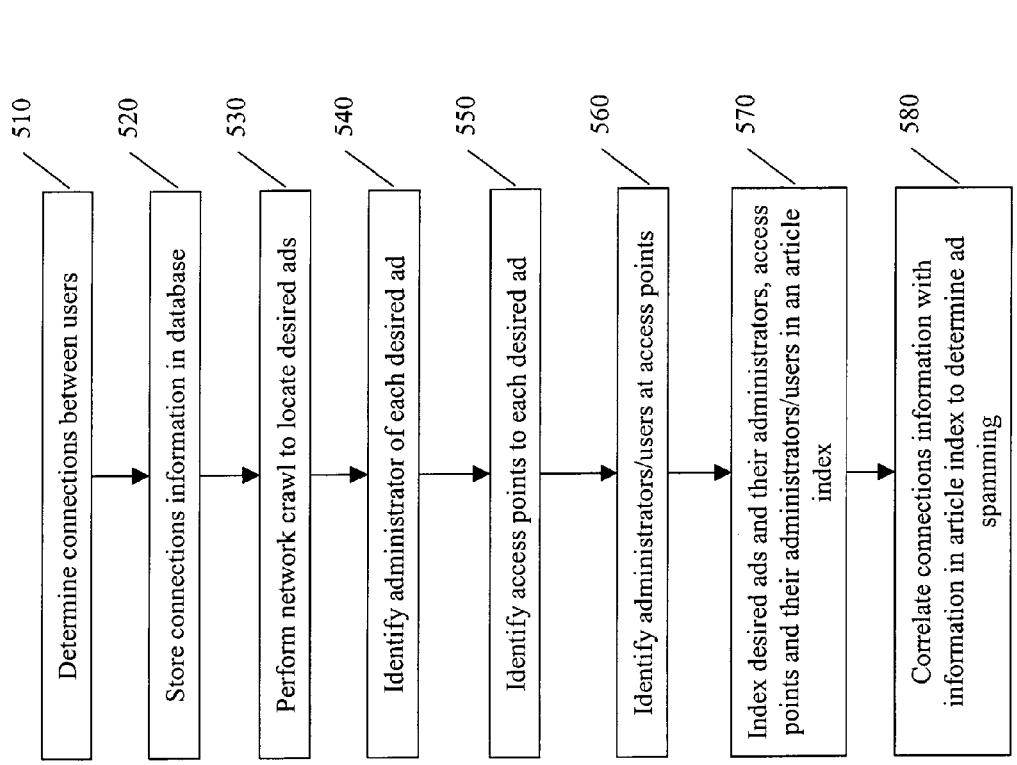
FIG. 5 depicts a process flow for correlating connections between users and links between articles in accordance with still another embodiment of the present invention.

FIGS. 3-5 provide exemplary methods that identify connections between users and links between articles and correlate the users' connections with the articles' links. The exemplary methods are provided by way of examples, as there are a variety of ways to carry out the methods according to the present invention. The methods shown in FIGS. 3-5 can be executed or otherwise performed by one or a combination of various systems. The methods in FIGS. 3-5 are described below as carried out by the system 100 shown in FIG. 1 by way of example, and various elements of the system 100 are referenced in explaining the example methods of FIGS. 3-5.

Referring now to the method depicted in FIG. 3, the method begins at 310 with the social network engine 168, or related devices, gathering personalization information of each member in the social network from the social network database 170 to determine connections between the members, including types of association, association levels and association weights given.

At 320, the social network engine 168 stores the connections information in the social network database 170, or another data storage device, at the social network site 160 or any other desired site. The connections information for each connection includes: 1) information identifying the members that are connected to or associated with one another; 2) the type or types of connection/association between the members, including the degree of separation between the members and any virtual links between the members; and 3) the level and weight assigned to each type of association.

Each member can be identified by the member's name, e-mail address, telephone number, address, and/or any other information that can uniquely identify the member and is maintained by the social network. As mentioned earlier in the exemplary social network description, the types of connection or association include: friendships, business relationships, family associations, acquaintances, community or group associations, activity partner associations, common interest associations, common characteristic associations, or any other suitable type of relationship connections (e.g., social relationship connection). For example, referring to the social network 200 in FIG. 2, the connections information determined and stored in the social network database 170 for the connection/association between profile A (vertex 202)

and profile B (vertex 204) would include: 1) information identifying a member A to which the profile A belongs and a member B to which the profile B belongs; 2) the business association (edge 224), the friendship association (edge 226), and the activity partner association (edge 228) between members A and B; and 3) the level and weight assigned to each of the business, friendship, and activity associations. As a further example, member A is at a best-friend level with member B, but a good-friend level (edge 232) with member C (represented by profile C at vertex 206); therefore, more weight is given to the friendship association between members A and B than the friendship association between members A and C.

Likewise, the connections information determined and stored in the social network database 170 for the connection/association between profile A (vertex 202) and profile G (vertex 214) would include: 1) information identifying a member A to which the profile A belongs and a member G to which the profile G belongs; 2) the two-degree-of-separation friendship association (edges 232 and 236) between members A and G; and 3) a lower weight assigned to such friendship association, relative to the weight assigned to the friendship association (edge 232) between members A and C.

Referring back to the method shown in FIG. 3, at 330, the search engine 158, or related devices, performs a crawl of the network 106 to locate one or more desired articles stored at other devices or systems coupled to the network 106. Alternatively, articles may be identified without a crawl—e.g., content sites may provide a list of article; all articles on a particular site can be associated with the owner; or article identifiers may be observed via a proxy log, which may contain a list of accesses by users to articles (e.g., users A and B are identified as being related based on which sites they visit, and exclude accesses to ads by B on a site owned by A, without ever crawling the site owned by A. The desired articles to be located are based on requests to correlate such articles with connections between members in a social network. For example, an administrator of the search site 150 or search engine 158 may request a review of a plurality of websites X, Y, Z to down-weight or up-weight links to and from such websites for future searches.

Next, at 340, also from the network crawl, the search engine 158 identifies the webmaster, web administrator, the owner, or any other entity responsible for the design, implementation, operation, and/or maintenance of each article in order to associate an administrator identifier with each of desired articles that have been located. The article administrator can be identified through a search of the content of each article for any information that can identify the administrator. For example, an article such as a website can be searched for contact or authorship information (e.g., name, e-mail address, postal address and/or telephone number). In another example, an article administrator can be identified from a domain name registration service that provides registration for the particular article or the web site that hosts the article. In another example, an article administrator may be inferred from access patterns; for example, it can be inferred that a user is likely to be the administrator of a site based on the frequency or uniformity of accesses to articles on the site (e.g., other users may access specific pages while the administrator may access more of the pages when testing their site, or the administrator may regularly check certain pages). In another example, an article administrator may be identified by analyzing a news group of bulletin board postings where the administrator refers to the article or an associated entity such as a web site.

At 350, also from the network crawl, the search engine 158 searches the content of each desired article to determine if it provides links to other articles. For example, the content of a first desired article (hereinafter, "linking article") is searched to determine if it provides links to one or more other articles (hereinafter, "destination articles"). Furthermore, the search engine 158 can search the contents of the destination articles to determine whether they provide links back to the first linking article. It should be noted that the destination articles can include the desired articles located at 330 or other articles.

At 360, assuming that the linking article provides links to one or more destination articles, the search engine 158 also obtains administrator identifiers for such destination articles in the same manner as explained at 340.

At 370, the search engine 158 indexes the desired articles (i.e., linking articles) by their article identifiers, administrator identifiers, links to other destination articles, the administrator identifiers for the destination articles, and any links from the destination articles back to the linking articles in an article index for storage in memory 156 or any suitable data storage device. The article index can be in a spreadsheet or table format, or any other format, that allows a search for an article, and its associated administrator through an administrator identifier. In other embodiments, the desired articles can be processed in some order, without being indexed, for storage in and subsequent retrieval from memory 156 or any suitable data storage device. Further, the processing of the desired articles may occur anywhere at the search site 150 or any other location(s), and on one or more machines, servers, or systems.

At 380, the search engine 158 communicates with the social network engine 168 to: 1) look up the stored connections information in the social network database 170; 2) correlate the connections information with the information found in the article index to determine types of association, including association levels and weights given, between administrators of linking articles and those of destination articles; and 3) assign searching weights or importance of each links between articles for future searches at the search site 150 with the search engine 158. For example, referring back to the social network 200 in FIG. 2, a member A with the associated profile A (vertex 202) may maintain a website A that includes links to websites B and C maintained by member B (with associated profile B at vertex 204) and member C (with associated profile B at vertex 206), respectively. As described earlier, members A and B are at a best-friend level, whereas members A and C are at a good-friend level. Thus, more association weight is given to the friendship association between members A and B than the friendship association between members A and C. As a result, member A is determined to have a more favorable bias towards member B and associated website B, and any link from website A to website B may not be considered independent and thus accorded a lower searching weight or importance for searching purposes. On the contrary, because of a lower-weight association between members A and C, and therefore less favorable bias, any link from website C to website A may be considered independent and thus accorded a higher weight or importance for searching purposes. The amount of searching weight or importance assigned to each type, level, and weight of association merely depends on the programming of the search engine 158, as based on the desire of the search site 150.

Referring now to the method depicted in FIG. 4, similar to the method depicted in FIG. 3, this method also begins at 410 with the social network engine 168, or related devices, gathering personalization information of each member in the social network from the social network database 170 to determine connections between the members, including types of association, association levels and association weights given.

At 420, the social network engine 168 also stores the connections information in the social network database 170, or another data storage device, at the social network site 160 or any other desired site. The connections information for each connection includes: 1) information identifying the members that are connected to or associated with one another; 2) the type or types of connection/association between the members, including the degree of separation between the members and any virtual links between the members; and 3) the level and weight assigned to each type of association.

As mentioned earlier, each member can be identified by the member's name, e-mail address, telephone number, address, and/or any other information that can uniquely identify the member and is maintained by the social network. As mentioned earlier in the exemplary social network description, the types of connection or association include: friendships, business relationships, family associations, acquaintances, community or group associations, activity partner associations, common interest associations, common characteristic associations, or any other suitable type of relationship connections (e.g., social relationship connection). Examples of the connection/association are as provided earlier with reference to 320 in FIG. 3.

At 430, the search engine 158, or related devices, also performs a crawl of the network 106 to locate one or more desired articles stored at other devices or systems coupled to the network 106. The desired articles to be located are based on requests to correlate such articles with connections between members in a social network. For example, an administrator of the search site 150 or search engine 158 may request a review of a plurality of websites X, Y, Z to down-weigh or up-weigh links to and from such websites for future searches.

Next, at 440, also from the network crawl, the search engine 158 identifies the webmaster, web administrator, or any other entity responsible for the design, implementation, and/or maintenance of each article in order to associate an administrator identifier with each of desired articles that have been located. The article administrator can be identified through a search of the content of each article for any information that can identify the administrator. For example, an article such as a website can be searched for contact or authorship information (e.g., name, e-mail address, postal address and/or telephone number). In another example, an article administrator can be identified from a domain name registration service that provides registration for the particular article or the web site that hosts the article. In another example, an article administrator may be inferred from access patterns; for example, it can be inferred that a user is likely to be the administrator of a site based on the frequency or uniformity of accesses to articles on the site (e.g., other users may access specific pages while the administrator may access more of the pages when testing their site, or the administrator may regularly check certain pages). In another example, an article administrator may be identified by analyzing a news group of bulletin board postings where the administrator refers to the article or an associated entity such as a web site.

At 450, if authorized or provided by the administrators of each desired article (or any other entity with authority over such article), the search engine 158 can obtain information regarding access to each desired article and identify the points of access to the article. For example, when an access is made to the article, such access can be traced back from the article to the point of access to identify the corresponding IP address and the user associated with such IP address. In another example, the point of access has embedded cookie(s) for identification, and the access can be traced back to retrieve the embedded cookie(s) to identify the user accessing the article. In another example, the user accessing an article may be known by the service provider, for example, a user may have an account with an ISP and when they connect to the network the ISP knows the user and which articles they access. Further, the search engine 158 can search the desired articles to determine whether it also provides links back to the points of access, for example, when such points of access are also articles (hereinafter, "accessing articles"). It should be noted that the accessing articles can include the desired articles located at 430 or other articles.

At 460, assuming that there are one or more points of access identified, the search engine 158 also obtains administrator/user identifiers at such points of access in the same manner described earlier at 340.

At 470, the search engine 158 indexes the desired articles (i.e., linking articles) by their article identifiers, administrator identifiers, their points of access, the administrator identifiers or users at the points of access, and any links from each desired article back to its accessing articles in an article index for storage in memory 156 or any suitable data storage device. The article index can be in a spreadsheet or table format, or any other format, that allows a search for an article, and its associated administrator through an administrator identifier.

At 480, the search engine 158 communicates with the social network engine 168 to: 1) look up the stored connections information in the social network database 170; 2) correlate the connections information with the information found in the article index to determine types of association, including association levels and weights given, between administrators of desired articles and those administrators/users at the points of access; and 3) assign searching weights or importance of each link between articles for future searches at the search site 150 with the search engine 158. For example, referring back to the social network 200 in FIG. 2, a member A with the associated profile A may maintain a website A that is accessed by B and C from their own respective websites (e.g., accessing articles) and/or their own connections to the network 106 (e.g., IP addresses). As described earlier, members A and B are at a best-friend level, whereas members A and C are at a good-friend level. Thus, more association weight is given to the friendship association between members A and B than the friendship association between members A and B. As a result, member B is determined to have a more favorable bias towards member A and associated website A, and any link from a website or IP address of B to website A may not be considered independent and thus accorded a lower searching weight or importance for searching purposes. On the contrary, because of a lower-weight association between members A and C, and therefore less favorable biased, any link from website or IP address of C to website A may be considered independent and thus accorded a higher weight or importance for searching purposes. The amount of searching weight or importance assigned to each type, level, and weight of association merely depends on the programming of the search engine 158, as based on the desire of the search site 150.

Referring now to the method depicted in FIG. 5, this method begins at 510 with the social network engine 168, or related devices, gathering personalization information of each member in the social network from the social network database 170 to determine connections between the members, including types of association, association levels and association weights given.

At 520, the social network engine 168 stores the connections information in the social network database 170, or another data storage device, at the social network site 160 or any other desired site. The connections information for each connection includes: 1) information identifying the members that are connected to or associated with one another; 2) the type or types of connection/association between the members, including the degree of separation between the members and any virtual links between the members; and 3) the level and weight assigned to each type of association.

As mentioned earlier, each member can be identified by the member's name, e-mail address, telephone number, address, and/or any other information that can uniquely identify the member and is maintained by the social network. As mentioned earlier in the exemplary social network description, the types of connection or association include: friendships, business relationships, family associations, acquaintances, community or group associations, activity partner associations, common interest associations, common characteristic associations, or any other suitable type of relationship connections (e.g., social relationship connection). Examples of the connection/association are as provided earlier with reference to 320 in FIG. 3

At 530, the search engine 158, or related devices, performs a crawl of the network 106 to locate one or more desired articles that are ads on the network 106. The desired ads to be located are based on requests to correlate such ads with connections between members in a social network. The desired ads, which can be all ads, can be located as identified by advertisers of such ads or others who wish to detect spamming of the ads. For example, an advertiser of an ad hosted at a website is suspicious of the click-through rate (CTR) it receives from the ad and wishes to verify that the CTR is independent from the hosted website.

Next, at 540, also from the network crawl, the search engine 158 identifies the advertiser, or any other entity responsible for the design, implementation, and/or maintenance of each ad, in order to associate an administrator identifier with each of desired ads that have been located. The advertiser can be identified from information provided by the advertiser itself. Alternatively, the advertiser can be identified from a search of the ad content for any information that can identify the ad administrator, the content of the article to which the ad is linked, and/or a domain name registration service that provides registration of the ad and/or the ad-linked-to article.

At 550, as authorized or provided by the ad administrators of each desired article (or any other entity with authority over such article), the search engine 158 can obtain information regarding access to each desired ad and identify the points of access to the ad. For example, when an access is made to the ad, such access can be traced back from the ad to the point of access to identify the corresponding IP address and the user associated with such IP address. In another example, the point of access has embedded cookie(s) for identification, and the access can be traced back to retrieve the embedded cookie(s) to identify the user accessing the ad (or an ISP may know the user as mentioned earlier). Further, the search engine 158 can search the hosted article (e.g., hosted website) of the ad to determine whether such hosted article also provides links back to the points of access, for example, when such points of access are also articles (hereinafter, "accessing articles").

At 560, assuming that there are one or more points of access identified, the search engine 158 also obtains administrator identifiers or users at such points of access as described above.

At 570, the search engine 158 indexes the desired ads by their article identifiers, administrator identifiers, their points of access, the administrator identifiers or users at the points of access, and any link from each hosted article of each ad back to a point of access in an ad index for storage in memory 156 or any suitable data storage device. Similar to the article index, the ad index can be in a spreadsheet or table format, or any other format, that allows a search for an article, and its associated administrator through an administrator identifier.

At 580, the search engine 158 communicates with the social network engine 168 to: 1) look up the stored connections information in the social network database 170; 2) correlate the connections information with the information found in the ad index to determine types of association, including association levels and weights given, between administrators of desired articles and those administrators/users at the points of access; and 3) determine whether ad spamming exists between members based on, e.g., click through rates from associated members. For example, referring back to the social network 200 in FIG. 2, a member A with the associated profile A may maintain an ad at website A that is accessed by B and F from their own respective websites (e.g., accessing articles) and/or their own connections to the network 106 (e.g., IP addresses). As described earlier, members A and B are at a best-friend level, whereas members A and F are merely associated through three degrees of friendship. Thus, more association weight is given to the friendship association between members A and B. Accordingly, member B is determined to be more favorably biased toward member A, associated website A, and any ad hosted by website A. Thus, any click through of an ad hosted by website A from a website or IP address of B may be considered as ad spamming and disregarded. On the contrary, less association weight is given to the friendship association between members A and F. Accordingly, member F is determined to not exhibit any favorable bias toward member A. Thus, any click through of an ad hosted by website A from a website or IP address of F may be considered independent and counted as a legitimate click-through. The amount of weight or importance assigned to each type, level, and weight of association for a determination of ad spamming merely depends on the programming of the search engine 158, as based on the desire of the search site 150 and/or the entity seeking to identify ad spamming.

GENERAL

Although the invention has been described with reference to these embodiments, other embodiments could be made by those in the art to achieve the same or similar results. Variations and modifications of the present invention will be apparent to one skilled in the art based on the present disclosure, and the present invention encompasses all such modifications and equivalents.

The invention claimed is:

1. A computer-implemented method comprising:
  identifying, with one or more processors, a first connection between a first user and a second user in a social network and a second connection between the first user and a third user in the social network, each of the first and second connections including an association type and a degree of separation that identifies a fewest number of common characteristic associations separating the users;
  applying, with the one or more processors, a first association weight to the first connection that is higher than a second association weight applied to the second connection based on at least one of the association type and the degree of separation;
  identifying, with the one or more processors, the first user as a first administrator of a first article, the first article comprising a first link to a second article;

identifying, with the one or more processors, that the second user and the third user access the first article;

identifying, with the one or more processors, that the second user is a second administrator of the second article; and determining, with the one or more processors, a first importance score for the first link based on the first association weight, wherein the higher association weight indicates that the first connection is more biased.

2. The method of claim 1, further comprising:

searching the content of the first article to identify that the first article includes a second link to a third article;

identifying that the third user is a third administrator of the third article; and determining a second importance score for the second link based on the second association weight, wherein the first importance score is lower than the second importance score because of the higher association weight between the first and the second user.

3. The method of claim 1, wherein the second article is an advertisement and further comprising:

receiving a click-through of the advertisement from the second user; and discounting the click-through based on the bias between the first user and the second user.

4. The method of claim 1, wherein the association type comprises at least one of a friendship association, a business association, an activity partner association, a community association, a common characteristic association, a common interest association and a family association.

5. The method of claim 4, wherein the association type is a friendship association and the first and second association weights are also based on an association level that comprises at least one of a have not met level, an acquaintance level, a friend level, a good friend level and a best friend level.

6. The method of claim 1, further comprising locating the article based at least in part on a request from the first user.

7. The method of claim 1, further comprising creating an article index for the article, the administrator, the first connection and the second connection.

8. A system comprising:

one or more processors;

a social network engine stored in a memory and executable by the one or more processors, the social network engine for identifying a first connection between a first user and a second user in a social network and a second connection between the first user and a third user in the social network, each of the first and second connection including an association type and a degree of separation that identifies a fewest number of common characteristic associations separating the users and for applying a first association weight to the first connection that is higher than a second association weight applied to the second connection based on at least one of the association type and the degree of separation; and a search engine executable by the one or more processors, the search engine for identifying the first user as a first administrator of a first article, the first article comprising a first link to a second article, identifying that the second user and the third user access the first article, identifying that the second user is a second administrator of the second article and determining a first importance score for the first link based on the first association weight, wherein the higher association weight indicates that the first connection is more biased.

9. The system of claim 8, wherein the search engine:

searches the content of the first article to identify that the first article includes a second link to a third article;

identifies that the third user is the third administrator of the third article; and determines a second importance score for the second link based on the second association weight, wherein the first importance score is lower than the second importance score because of the higher association weight between the first and the second user.

10. The system of claim 8, wherein the second article is an advertisement and the search engine:

receives a click-through of the advertisement from the second user; and discounts the click-through based on the bias between the first user and the second user.

11. The system of claim 8, wherein the association type comprises at least one of a friendship association, a business association, an activity partner association, a community association, a common characteristic association, a common interest association and a family association.

12. The system of claim 11, wherein the association type is a friendship association and the first and second association weights are also based on an association level that comprises at least one of a have not met level, an acquaintance level, a friend level, a good friend level and a best friend level.

13. The system of claim 8, wherein the search engine locates the article based at least in part on a request from the first user.

14. A non-transitory computer program product comprising a computer useable medium including a computer readable program, wherein the computer readable program when executed on a computer causes the computer to:

identify a first connection between a first user and a second user in a social network and a second connection between the first user and a third user in the social network, each of the first and second connection including an association type and a degree of separation that identifies a fewest number of common characteristic associations separating the users;

apply a first association weight to the first connection that is higher than a second association weight applied to the second connection based on at least one of the association type and the degree of separation;

identify the first user as a first administrator of a first article, the first article comprising a first link to a second article;

identify that the second user and the third user access the first article;

identify that the second user is a second administrator of the second article; and determine a first importance score for the first link based on the first association weight, wherein the higher association weight indicates that the first connection is more biased.

15. The non-transitory computer program product of claim 14, wherein the computer readable program when executed on the computer further causes the computer to:

search the content of the first article to identify that the first article includes a second link to a third article;

identify that the third user is the administrator of the third article; and determine a second importance score for the second link based on the second association weight, wherein the first importance score is lower than the second importance score because of the higher association weight between the first and the second user.

16. The non-transitory computer program product of claim 14, wherein the second article is an advertisement and the computer readable program when executed on the computer further causes the computer to:
    receive a click-through of the advertisement from the second user; and
    discount the click-through based on the bias between the first user and the second user.

17. The non-transitory computer program product of claim 14, wherein the association type comprises at least one of a friendship association, a business association, an activity partner association, a community association, a common characteristic association, a common interest association and a family association.

18. The non-transitory computer program product of claim 17, wherein the association type is a friendship association and the first and second association weights are also based on an association level that comprises at least one of a have not met level, an acquaintance level, a friend level, a good friend level and a best friend level.

19. The non-transitory computer program product of claim 14, wherein the computer readable program when executed on the computer further causes the computer to locate the article based at least in part on a request from the first user.

20. The non-transitory computer program product of claim 14, wherein the computer readable program when executed on the computer further causes the computer to create an article index for the article, the administrator, the first connection and the second connection.

\* \* \* \* \*